United States Patent
Yamashita et al.

(10) Patent No.: US 6,961,206 B2
(45) Date of Patent: Nov. 1, 2005

(54) CASSETTE HOLDER ALLOWING LARGE AND SMALL CASSETTES TO BE SELECTIVELY LOADED

(75) Inventors: Kouhei Yamashita, Hachiouji (JP); Jo Ebara, Sagamihara (JP)

(73) Assignee: Victor Company of Japan, Ltd., (JP)

( * ) Notice: Subject to any disclaimer, the term of this patent is extended or adjusted under 35 U.S.C. 154(b) by 184 days.

(21) Appl. No.: 10/649,540

(22) Filed: Aug. 27, 2003

(65) Prior Publication Data

US 2004/0159566 A1    Aug. 19, 2004

(30) Foreign Application Priority Data

Aug. 28, 2002 (JP) .............................. 2002-248341

(51) Int. Cl.[7] ............................................. G11B 15/60
(52) U.S. Cl. ...................................................... 360/94
(58) Field of Search .......................... 360/92, 94, 96.5, 360/132

(56) References Cited

U.S. PATENT DOCUMENTS 5,602,695 A  *  2/1997  Nishijima et al. ............. 360/94
5,739,979 A  *  4/1998  Busch .......................... 360/94
5,889,632 A  *  3/1999  Aoki ............................ 360/94
5,956,202 A  *  9/1999  Suzuki ......................... 360/94
6,563,667 B1 *  5/2003  Hamabe et al. ............... 360/94

FOREIGN PATENT DOCUMENTS

JP          09-265697          10/1997
JP          2002-170305         6/2002
JP          2002-170305 A  *    6/2002

* cited by examiner

Primary Examiner—Jefferson Evans
(74) Attorney, Agent, or Firm—Renner, Kenner, Greive, Bobak, Taylor & Weber

(57) ABSTRACT

A holder for the selected loading of a large or small cassette. A pair of positioning-restriction elements is provided inside the cassette holder at a distance enough for the small cassette to be loaded therebetween. A cassette detector detects the large cassette when it is loaded through the cassette opening. A drive mechanism moves the restriction elements from positions allowing the small cassette to be loaded to positions where the restriction elements allow the large cassette TO be loaded. A pair of flaps is positioned so that each flap is closer to the front-end section of the cassette opening than the positioning-restriction elements. The distance between the flaps allows the small cassette to be loaded therebetween. The flaps are opened so the large cassette can be loaded and they obstruct the small cassette from being loaded when at least either of the flaps is pushed by the small cassette.

2 Claims, 10 Drawing Sheets

CASSETTE HOLDER ALLOWING LARGE AND SMALL CASSETTES TO BE SELECTIVELY LOADED

BACKGROUND OF THE INVENTION

The present invention relates to a cassette holder into which a large cassette and a small cassette are selectively loaded.

A known type of cassette holder allows a large cassette and a small cassette in the same recording format to be selectively loaded.

This type of cassette holder has a cassette opening into which a large cassette fits. Therefore, this type of cassette holder is equipped with a positioning-restriction mechanism for restricting the position of a small cassette so that the small cassette can be accurately loaded into a predetermined position in the holder, through the cassette opening having the large-cassette size.

FIG. 1 is a perspective view showing major components of a known cassette holder having a small-cassette positioning-restriction mechanism.

Illustrated in FIG. 1 are components peripheral to a cassette opening through which a large cassette (not shown) or a small cassette 1S is loaded. The cassette opening has the right size (width and height) for the large cassette.

An upper surface 2a of a frame 2 is a part of the bottom surface of the cassette opening. A shaft 3 is pivotally mounted on the frame 2. Integrally formed on the shaft 3 are guides 4a and 4b, the positioning-restriction mechanism for restricting the position of the small cassette 1S in the cassette holder.

The guides 4a and 4b protrude from the bottom surface of the cassette opening (the upper surface 2a of the frame 2). The distance between the guides 4a and 4b matches the width of the small cassette 1S so that the cassette 1S can be loaded into the cassette holder between the guides 4a and 4b.

The small cassette 1S comes into contact with either the guide 4a or 4b when it is shifted to left or right while being loaded. The cassette 1S is thus obstructed from being loaded by the guide 4a or 4b. In other words, the cassette 1S cannot be loaded into any position other than a predetermined position. The guide 4a or 4b thus guide the small cassette 1S to the predetermined position.

Although not shown in FIG. 1, the known cassette holder is equipped with a cassette detector for detecting that a large cassette wider than the smaller cassette 1S is loaded. It is provided inside the cassette holder (in a cassette-loading direction) when viewed from the cassette opening. It is located between the guides 4a and 4b, and the front-end section of the cassette opening (in a cassette-unloading direction).

When the cassette detector detects the loaded large cassette, the shaft 3 rotates until the guides 4a and 4b are positioned at the same level as or lower than the bottom surface of the cassette opening.

This mechanism allows the large cassette to be loaded into the cassette holder with no obstruction by the guides 4a and 4b.

As explained, the large and small cassettes can be selectively loaded into the known cassette holder.

Another component not shown in FIG. 1 is a flap for shutting the cassette opening. The guides 4a and 4b thus cannot be viewed from outside when the cassette opening is shut by the flap.

This mechanism causes users inconveniences such that he or she has to shift the small cassette 1S in left and right to find the guides 4a and 4b when loading it through the cassette opening via the flap.

SUMMARY OF THE INVENTION

A purpose of the present invention is to provide a cassette holder, equipped with a small-cassette positioning-restriction mechanism, into which large and small cassettes can be selectively and smoothly loaded.

The present invention provides a cassette holder into which a large cassette and a small cassette are selectively loaded, the small cassette having a width smaller than a width of the large cassette, the cassette holder including: a frame, an upper surface of the frame being a part of a bottom surface of a cassette opening having a size that fits the large cassette, the large or the small cassette being to be loaded through cassette opening; a pair of positioning-restriction elements, provided inside the cassette holder when viewed from the cassette opening, a distance between the positioning-restriction elements having a width enough for the small cassette to be loaded therebetween to a predetermined position in the cassette holder; a cassette detector to detect the large cassette when the large cassette is loaded through the cassette opening, at least a part of the cassette detector being positioned as being closer to a front-end section of the cassette opening than the positioning-restriction being when viewed from the cassette opening; a drive mechanism to move the positioning-restriction elements from positions at which the positioning-restriction elements allow the small cassette to be loaded therebetween to other positions at which the positioning-restriction elements do not obstruct the large cassette to be loaded, when the cassette detector destects the large cassette; and a pair of flaps, each flap being positioned as being closer to the front-end section of the cassette opening than the positioning-restriction elements being when viewed from the cassette opening, a distance between the flaps having a width enough for the small cassette to be loaded therebetween to the predetermined position in the cassette holder, the flaps being opened to allow the large cassette to be loaded when the flaps are pushed by the large cassette whereas the flaps being engaged with the positioning-restriction elements to obstruct the small cassette to be loaded when at least either of the flaps is pushed by the small cassette.

DETAILED DESCRIPTION OF PREFERRED EMBODIMENT

An embodiment according to the present invention will be disclosed with reference to the attached drawings.

Figure 2:
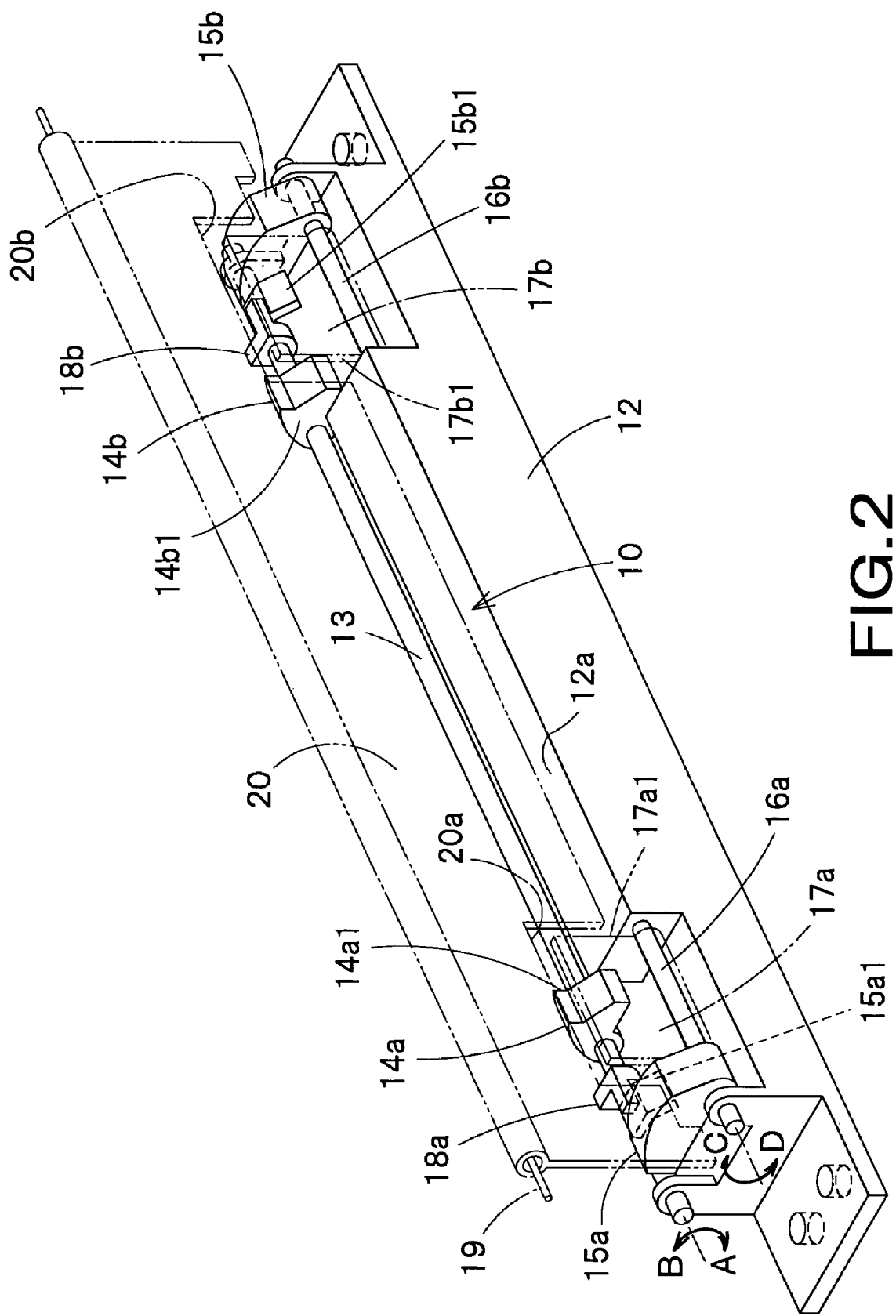
FIG. 2 is a perspective view showing major components of a cassette holder according to the present invention.

Illustrated in FIG. 2 are major components of a cassette holder according to the present invention, peripheral to a cassette opening 10 through which a large cassette 1L or a small cassette 1S (both will be disclosed later) is loaded.

Figure 3:
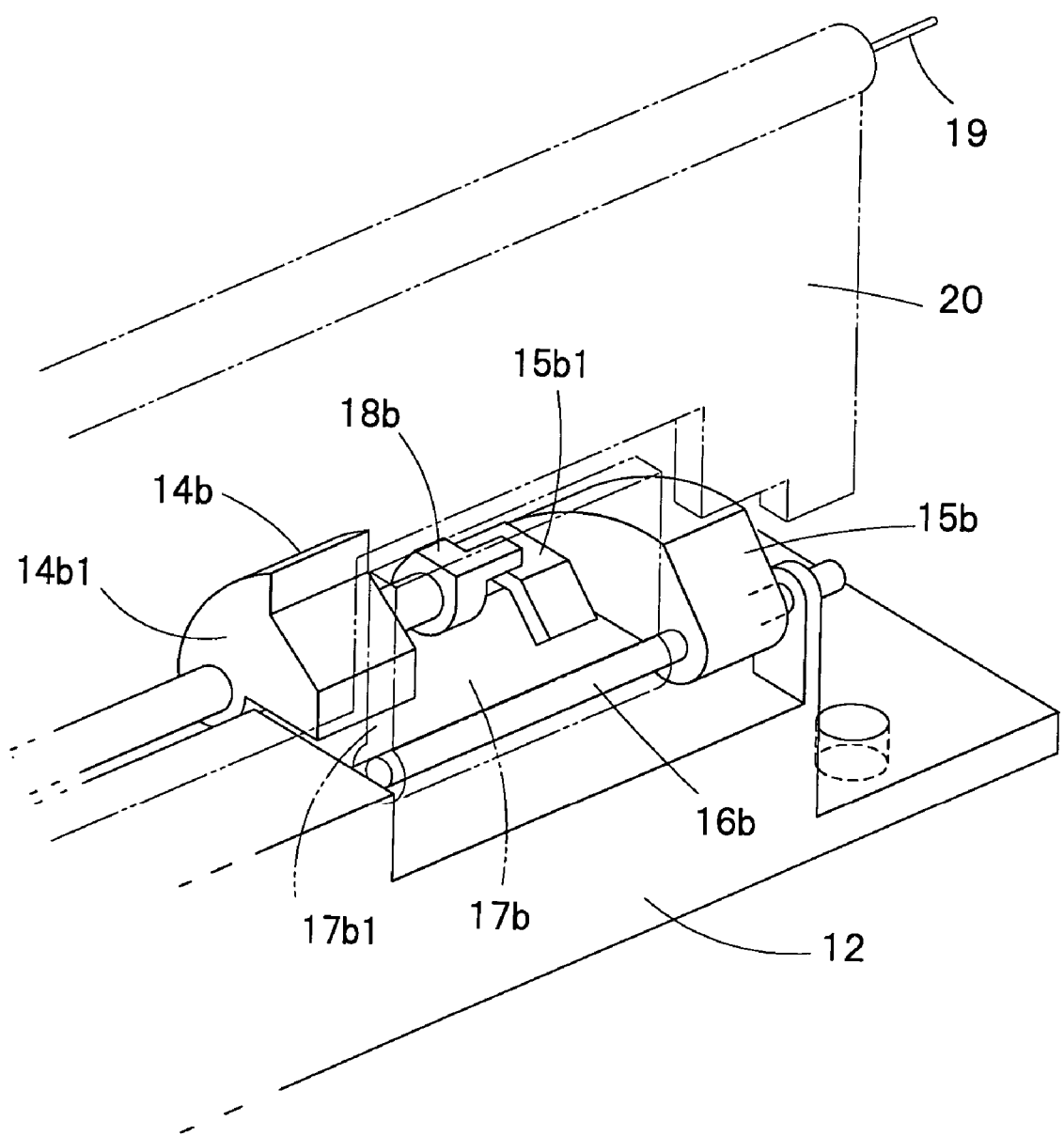
FIG. 3 is an enlarged perspective view of the major components at the right side thereof in FIG. 2.

The cassette opening 10 has a right size (width and height) that fits the large cassette 1L. FIG. 3 shows an enlarged view of the components at the right side thereof in FIG. 2.

An upper surface 12a of a frame 12 is a part of a bottom surface of the cassette opening 10. A shaft 13 is provided along the frame 12 as rotatable in directions indicated by arrows A and B.

Integrally formed on the shaft 13 are guides 14a and 14b, a pair of positioning-restriction elements for restricting the position of the small cassette 1S. The guides 14a and 14b may be formed as separate components and fixed on the shaft 13.

The shaft 13 and the guides 14a and 14b are provided as a little bit deep into the cassette holder (in a loading direction) when viewed from the front-end section of the cassette opening 10.

The guides 14a and 14b protrude from the bottom surface of the cassette opening 10 (the upper surface 12a of the frame 12). The distance between the guides 14a and 14b matches the width of the small cassette 1S so that the cassette 1S can be loaded into the cassette holder between the guides 14a and 14b. The distance between the guides 14a and 14b requires a width a little bit wider than the small cassette 1S so that the cassette 1S can be loaded therebetween.

Cassette detectors 15a and 15b are provided on both ends of the cassette opening 10 in the longitudinal direction. The detectors 15a and 15b are mounted on shafts 16a and 16b, respectively, that are attached to the frame 12. They are rotatable in directions indicated by arrows C and D in FIG. 2.

The cassette detectors 15a and 15b are provided so that at least a part of each detector protrudes towards the front-end section of the cassette opening 10 than each of the guides 14a and 14b does. This arrangement allows the large cassette 1L to come into contact with the detectors 15a and 15b before the guides 14a and 14b when loaded through the opening 10.

Pivotally mounted on the shafts 16a and 16b are lower flaps 17a and 17b, respectively, indicated by two dot-dashed lines so that the guides 14a and 14b located behind can be seen in FIGS. 2 and 3. The lower flaps 17a and 17b guide a user to an exact loading position when he or she loads it into the cassette opening 10.

The distance between inner surfaces 17a1 and 17b1 of the lower flaps 17a and 17b, respectively, in the longitudinal direction of the frame 12 fits the small cassette 1S. The locations of the inner surfaces 17a1 and 17b1 are almost equal to those of inner surfaces 14a1 and 14b1 of the guides 14a and 14b, respectively, in the longitudinal direction of the frame 12. It is preferable to chamfer the inner surfaces 17a1 and 17b1 of the lower flaps 17a and 17b, respectively, for smooth loading of the small cassette 1S.

Protrusions 15a1 and 15b1 are integrally formed on the cassette detectors 15a and 15b, respectively. Each protrusion is formed inside the corresponding detector in the longitudinal direction of the frame 12.

Integrally mounted on the shaft 13 are stoppers 18a and 18b that engage with the protrusions 15a1 and 15b1, respectively.

The shaft 13 is energized by a spring (not shown) in a direction indicated by the arrow A.

Figure 4:
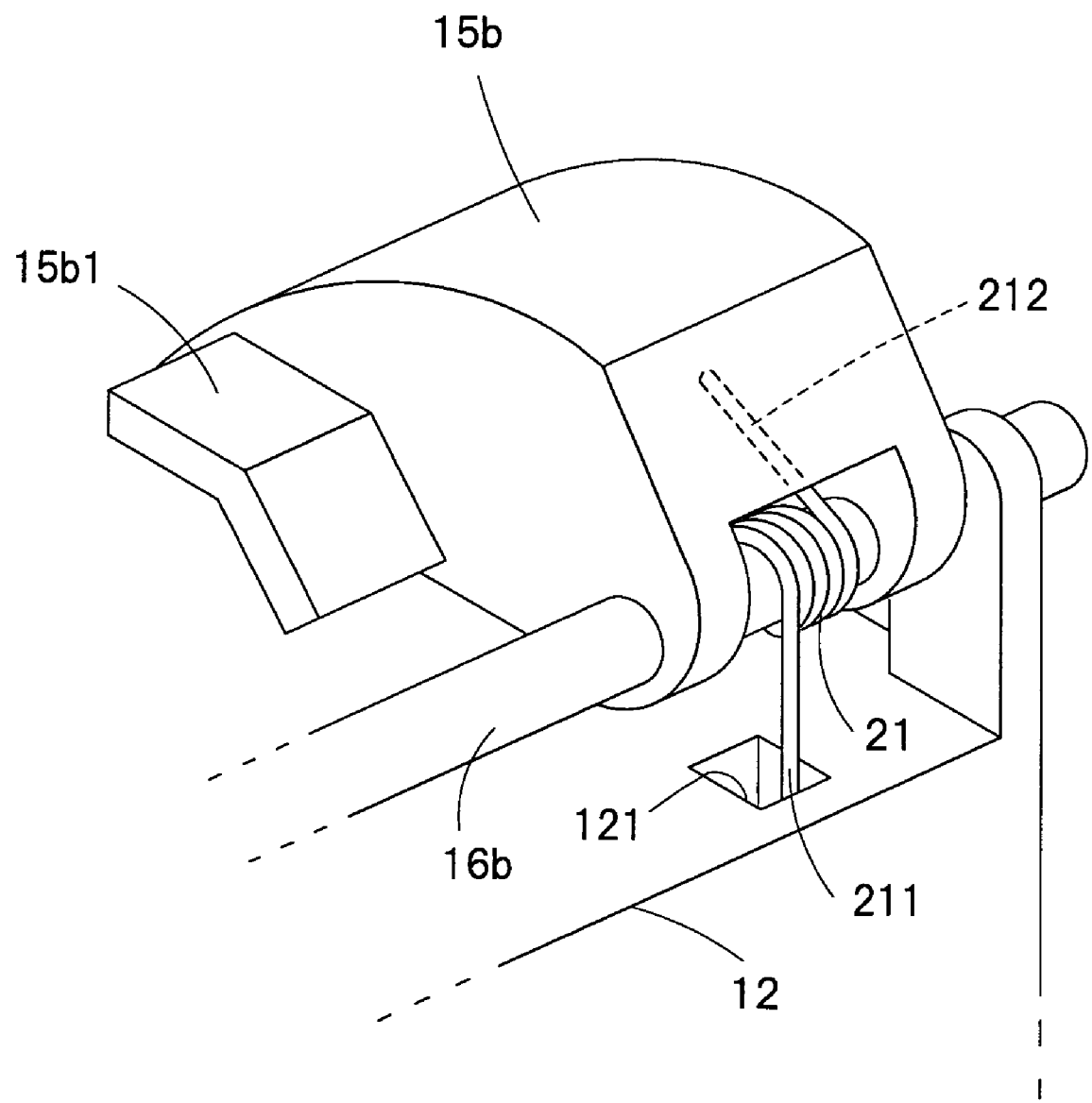
FIG. 4 is an enlarged perspective view illustrating a rotation drive mechanism.

Each of the cassette detectors 15a and 15b is also energized by a spring, such as, a torsion spring 21 shown in FIG. 4, in a direction indicated by the arrow C in FIG. 2.

Illustrated in FIG. 4 is the torsion spring 21 for energizing the cassette detector 15b. The same arrangement is, however, applied to the cassette detector 15a.

In detail, as shown in FIG. 4, one end portion 211 of the torsion spring 21 is inserted into an opening 121 formed on the frame 12 whereas the other end portion 212 of the torsion spring 21 is made contact with the rear surface of the cassette detector 15b (15a).

The torsion spring 21 provided as above energizes the cassette detector 15b (15a) in the direction indicated by the arrow C in FIG. 2.

The torsion spring 21 and the opening 121 are shown only in FIG. 4, for brevity.

These springs are adjusted so that the force in the direction indicated by the arrow C for the cassette detectors 15a and 15b is greater than the force in the direction indicated by the arrow A for the shaft 13.

The spring settings allow the cassette detectors 15a and 15b to rotate the shaft 13 from a state illustrated in FIGS. 9 and 10 (which will be explained later) to another state illustrated in FIGS. 2 and 3, due to the engagement of the protrusions 15a1 and 15b1, and the stoppers 18a and 18b, respectively.

The guides 14a and 14b and also the stoppers 18a and 18b do not, however, rotate in the direction indicated by the arrow B from the positions illustrated in FIGS. 2 and 3.

Figure 5:
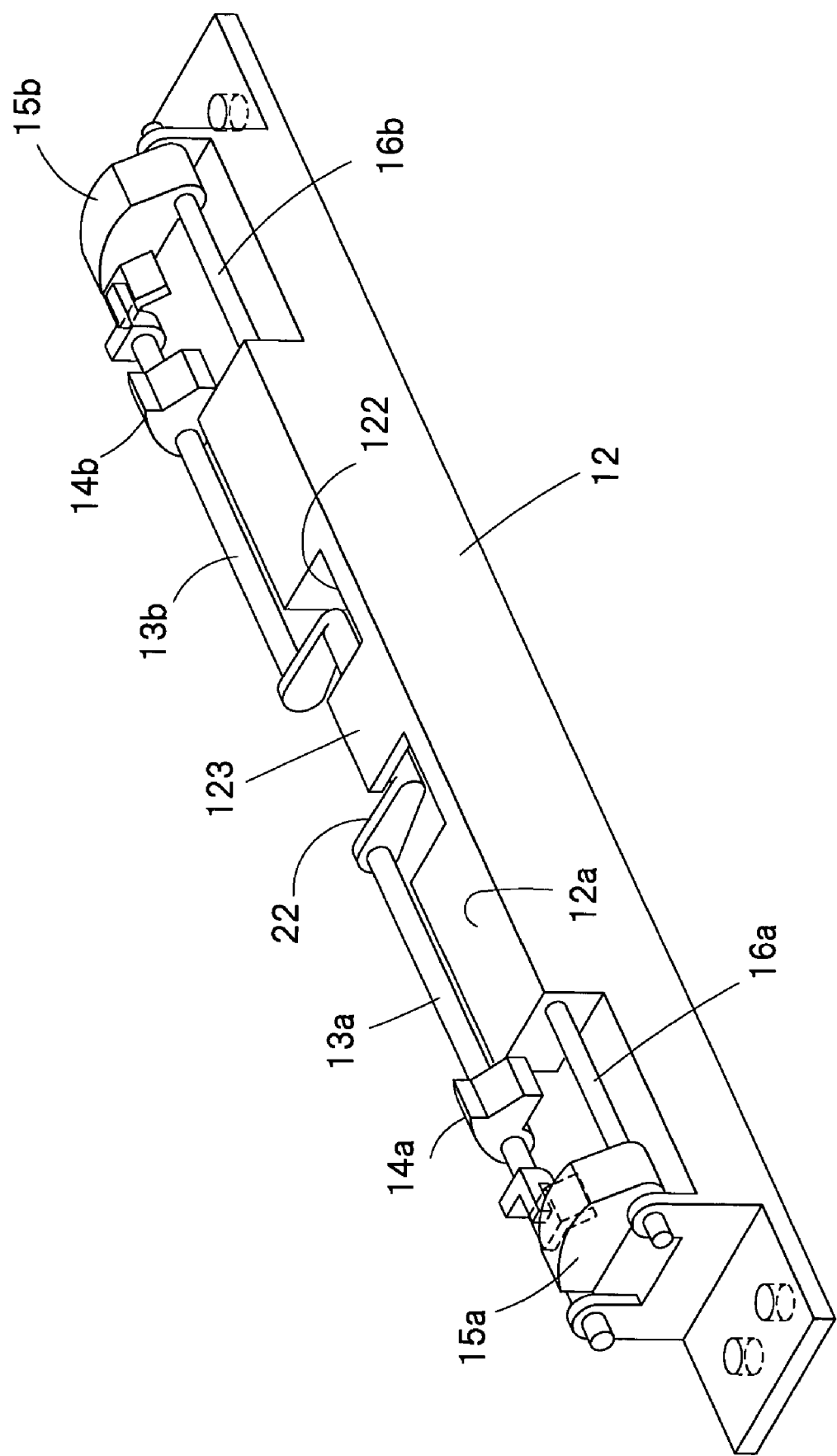
FIG. 5 is a perspective view showing a rotation restriction mechanism.

This is achieved by a mechanism, for example, shown in FIG. 5.

The frame 12 is provided with a cut-away section 122 formed almost in the middle of the frame 12 in the longitudinal direction, which is cut away from a back-end section to a front-end section of the frame 12 in the width direction.

Formed on the cut-away section 122 almost in the middle thereof is a protrusion 123 flush with the upper surface 12a of the frame 12.

The shaft 13 consists of two shafts 13a and 13b joined to each other with a crank 22.

When the shaft 13 is rotated, the crank 22 comes into contact with the protrusion 123 of the frame 12 to obstruct further rotation of the shaft 13.

This mechanism keeps the guides 14a and 14b, the cassette detectors 15a and 15b, and the stoppers 18a and 18b at their positions illustrated in FIGS. 2 and 3.

The shafts 13a and 13b, the crank 22, the cut-away section 122, and the protrusion 123 are shown only in FIG. 5, for brevity.

Referring back to FIGS. 2 and 3, pivotally mounted on a shaft 19 attached to a housing (not shown) is an upper flap 20 having a size (width and height) a little bit smaller than the cassette opening 10.

The upper flap 20 and the lower flaps 17a and 17b shut the cassette opening 10 to protect the cassette holder from dust. Like the lower flaps 17a and 17b, the upper flap 20 is indicated by two dot-dashed lines so that the guides 14*a* and 14*b*, etc., located behind can be seen in FIGS. 2 and 3.

Formed on the upper flap 20 are rectangular notches 20*a* and 20*b*. The lower flaps 17*a* and 17*b* are fit in the notches 20*a* and 20*b*, respectively, so that the upper flap 20 and the lower flaps 17*a* and 17*b* substantially form one plane, having a slight gap therebetween, to shut the cassette opening 10.

Disclosed next is how each component works when the small cassette 1S is loaded into the cassette holder as configured above.

The lower flaps 17*a* and 17*b* provided at both ends (in the longitudinal direction) of the front-end section of the cassette opening 10 guide the user to the exact loading position when he or she loads the small cassette 1S into the cassette opening 10.

The user pushes the upper flap 20 between the lower flaps 17*a* and 17*b* with the small cassette 1S to load the cassette into cassette holder.

The upper flap 20 then swings upwards inside the cassette holder while the small cassette 1S is being loaded between the guides 14*a* and 14*b*. The cassette 1S is thus accurately loaded into the specific position in the cassette holder for recording or reproduction.

On the contrary, loading of the small cassette 1S is prevented as explained with reference to FIGS. 6 and 7 when the user pushes the upper flap 20 with the small cassette 1S while shifting the cassette in left or right.

Figure 6:
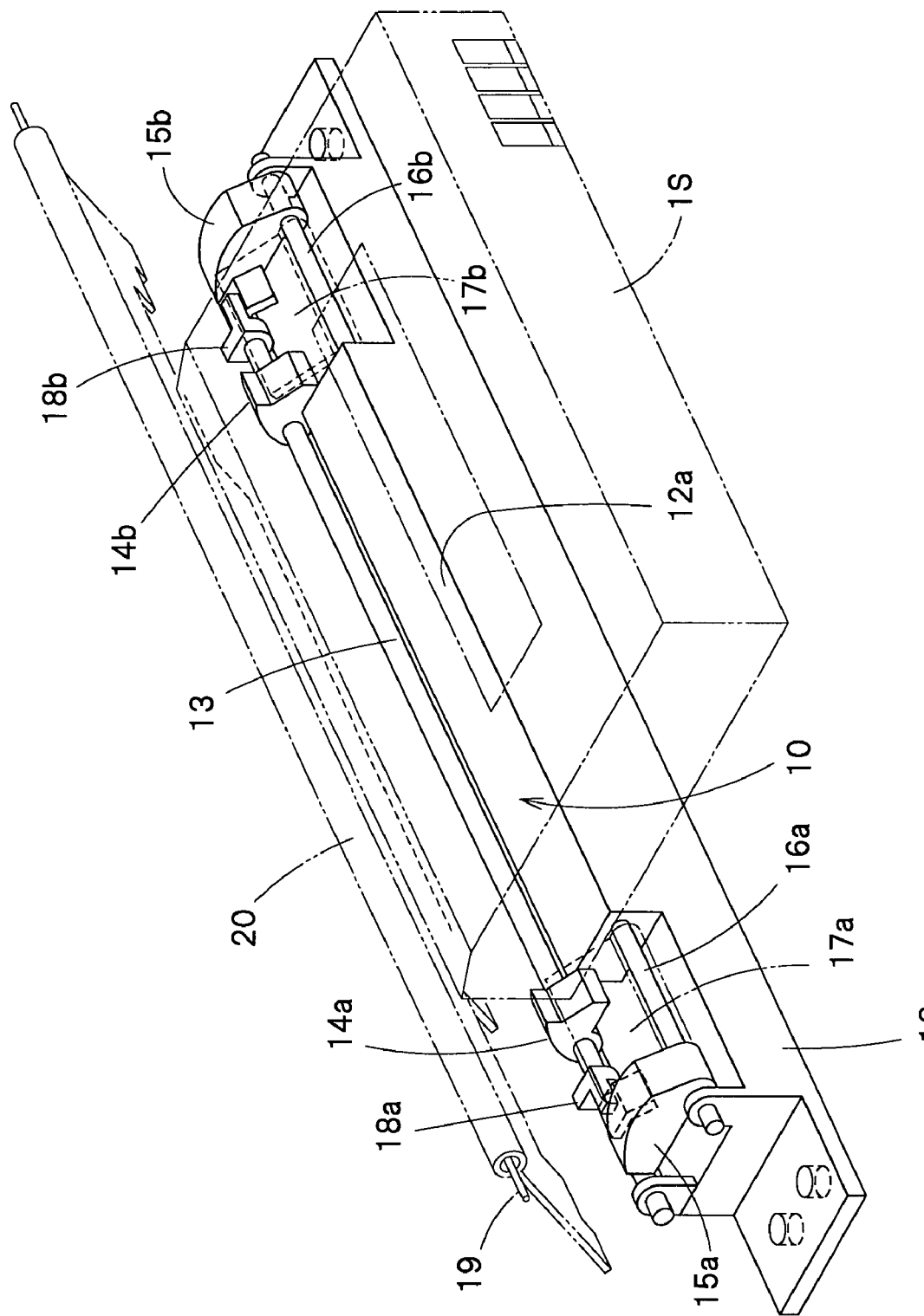
FIG. 6 shows a perspective view illustrating loading of a small cassette into the cassette holder according to the present invention.

Illustrated in FIG. 6 is loading of the small cassette 1S while shifted in right, or towards the lower flap 17*b*. In other words, the user pushes both the upper flap 20 and the lower flap 17*b* with the small cassette 1S.

The upper flap 20 and the lower flap 17*b* swing as illustrated in FIG. 6 when the user pushes these flaps with the small cassette 1S.

Figure 7:
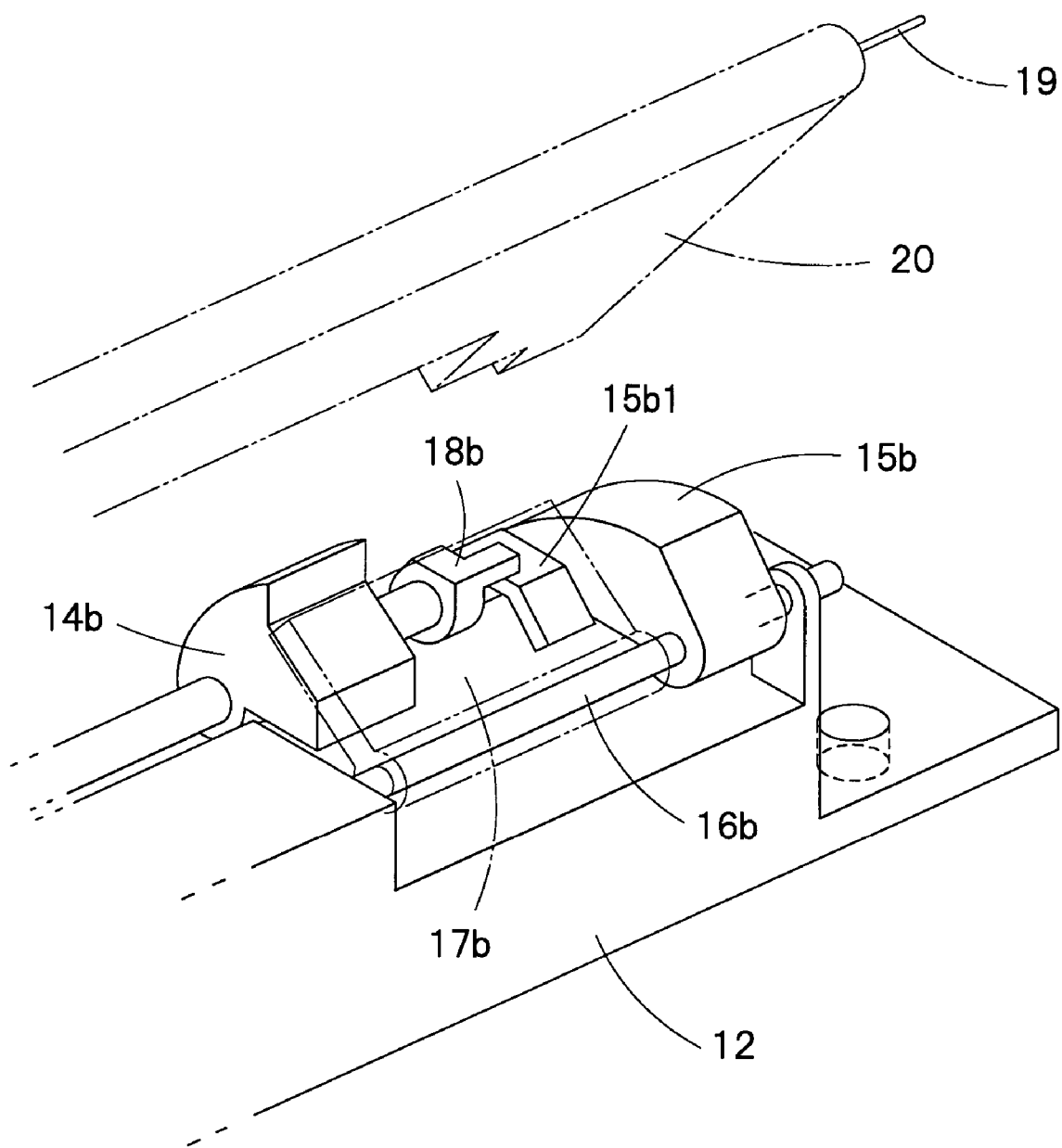
FIG. 7 shows an enlarged perspective view of the major components at the right side thereof in FIG. 6.
Figure 8A:
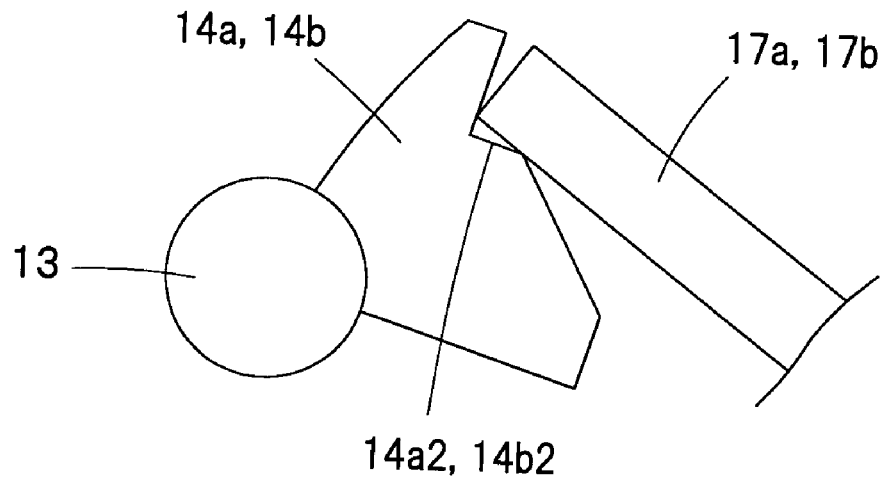
FIGS. 8A and 8B show fragmentally side views illustrating functions of the major components of a cassette holder according to the present invention.

Although not shown in FIGS. 2 to 7, engaging surfaces 14*a*2 and 14*b*2 are formed on the guides 14*a* and 14*b*, respectively, as shown in FIG. 8A.

When the lower flap 17*b* (17*a*) swings towards the guide 14*b* (14*a*), the guide 14*b* (14*a*) rotates a little bit in the direction indicated by the arrow A (FIG. 2).

The lower flap 17*b* (17*a*) then comes into contact with the engaging surface 14*b*2 (14*a*2) and is engaged with the guide 14*b* (14*a*), as illustrated in FIG. 8A. The guide 14*b* (14*a*) and the lower flap 17*b* (17*a*) are thus locked with no further rotation more than illustrated in FIG. 8A.

In detail, when the small cassette 1S is loaded while shifted towards the lower flap 17*b*, as shown in FIG. 6, the lower flap 17*b* is engaged with the guide 14*b* and locked obliquely, as illustrated in an enlarged view in FIG. 7. The obliquely locked lower flap 17*b* prevents the small cassette 1S from being loaded into the cassette holder in an incorrect direction. This makes the user notice that the small cassette 1S is being loaded while shifted in right, or towards the lower flap 17*b*.

FIGS. 6 and 7 illustrate loading of the small cassette 1S while shifted towards the lower flap 17*b*.

The lower flap 17*a* and the guide 14*a* work in the same way as the counterparts 17*b* and 14*b* when the small cassette 1S is loaded while shifted in left, or towards the lower flap 17*a*.

Figure 9:
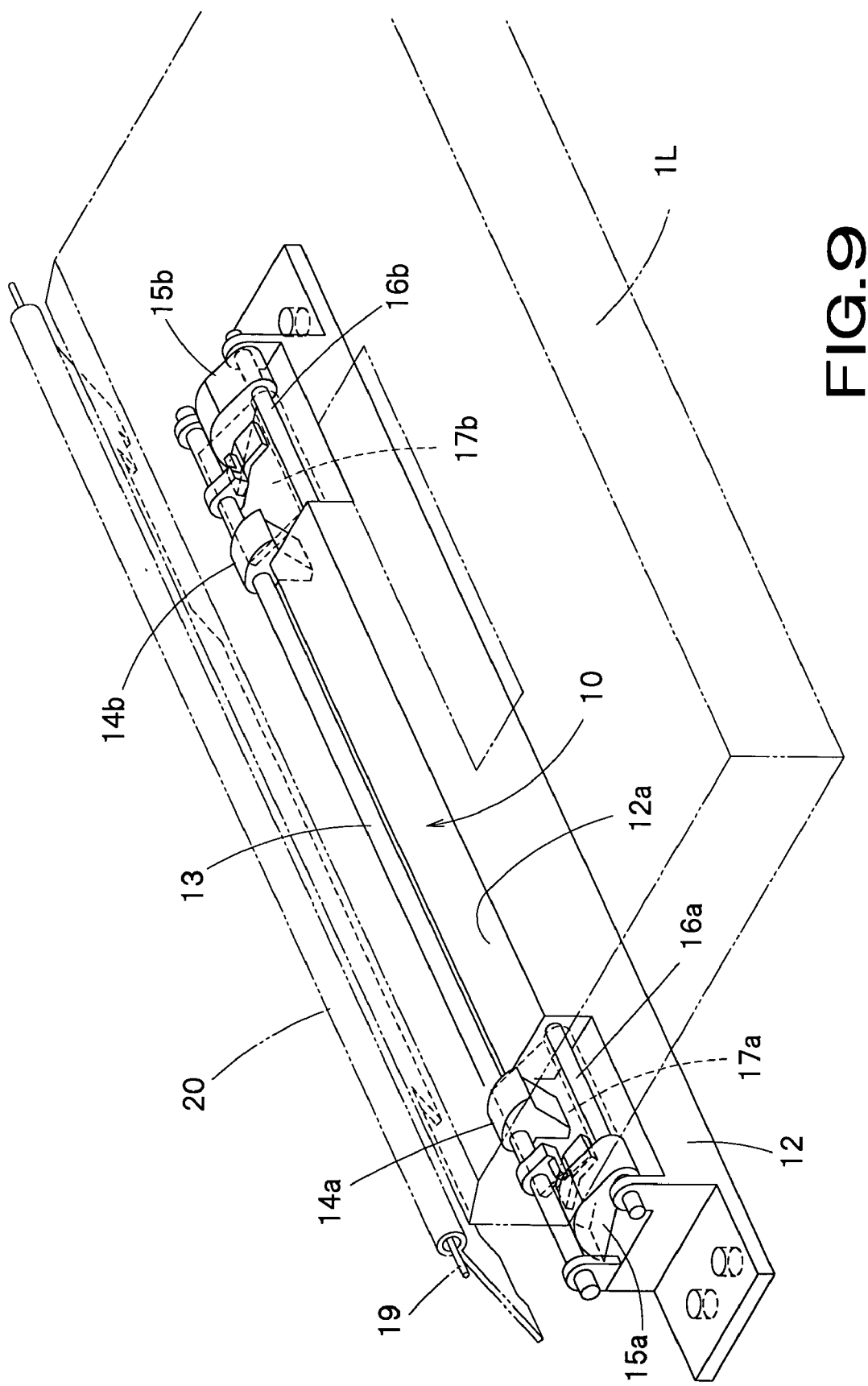
FIG. 9 shows a perspective view illustrating loading of a large cassette 1L into the cassette holder according to the present invention.
Figure 10:
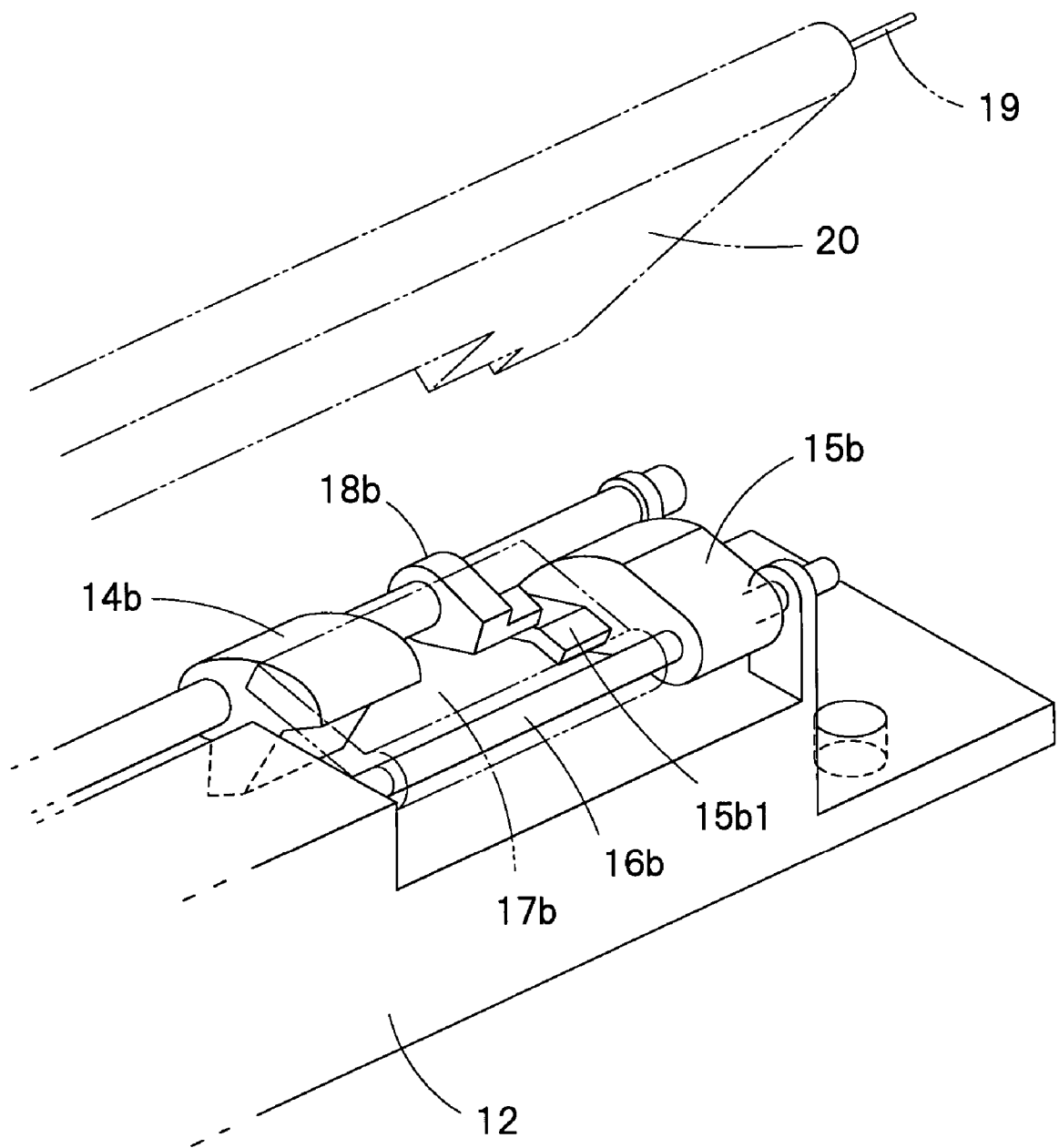
FIG. 10 shows an enlarged perspective view of the major components at the right side thereof in FIG. 9.

Disclosed next with reference to FIGS. 9 and 10 is loading of the large cassette 1L.

Suppose that the user pushes the lower flaps 17*a* and 17*b* and the upper flap 20 with the large cassette 1L to load the cassette into the cassette holder.

This loading action allows the cassette detector 15*b* and the lower flap 17*b* both pivotally mounted on the shaft 16*b* to rotate in a bottom direction, indicated by an arrow D in FIG. 2, of the cassette opening 10. The same movement occurs to the cassette detector 15*a* and the lower flap 17*a* both pivotally mounted on the shaft 16*a*.

The rotation of the cassette detectors 15*a* and 15*b* in the direction indicated by the arrow D releases the force from acting the protrusions 15*a*1 and 15*b*1 to rotate the shaft 13 in the direction indicated by the arrow B (FIG. 2) via the stoppers 18*a* and 18*b*.

The release of force allows the shaft 13 to rotate in the direction indicated by the arrow A while the cassette detectors 15*a* and 15*b* are swinging in the direction indicated by the arrow D. This occurs because the shaft 13 has been energized by a spring (not shown) in the direction indicated by the arrow A.

The rotation of the shaft 13 in the direction indicated by the arrow A allows the guides 14*a* and 14*b*, the cassette detectors 15*a* and 15*b*, and the stoppers 18*a* and 18*b* facing upwards (FIG. 2) to swing downwards (leave from the original positions) below the bottom surface of the cassette opening 10, as shown in FIGS. 9 and 10, in the direction indicated by the arrow D (FIG. 2).

As disclosed, the torsion spring 21 and other springs (not shown) work as a drive mechanism to swing the guides 14*a* and 14*b*, the stoppers 18*a* and 18*b*, and the cassette detectors 15*a* and 15*b* so as to allow loading the large cassette 1L.

Illustrated in FIGS. 9 and 10 is the states of the guides 14*a* and 14*b*, the cassette detectors 15*a* and 15*b*, and the stoppers 18*a* and 18*b* just before swinging downwards below the bottom surface of the cassette opening 10.

Figure 8B:
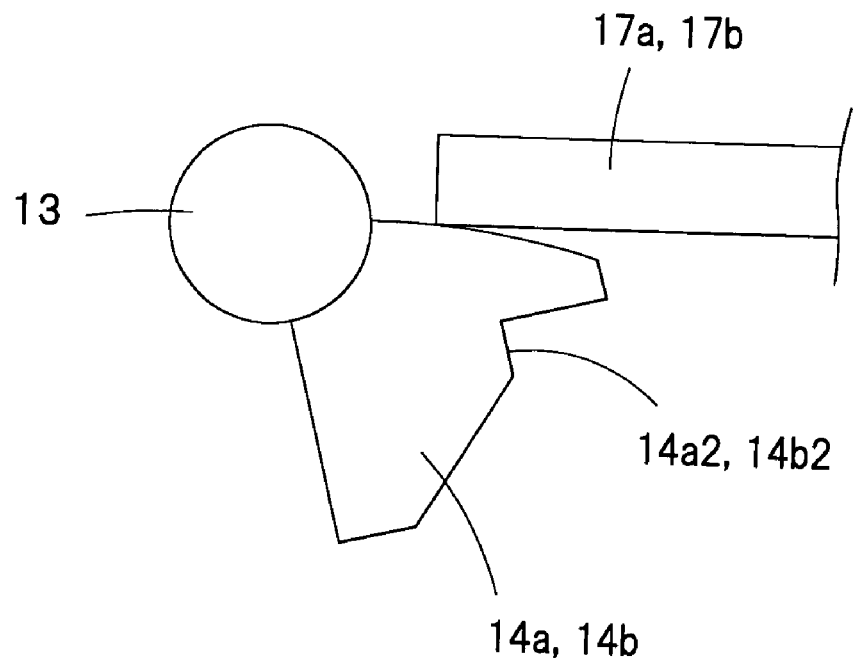

In contrast, FIG. 8B illustrates the states of the lower flaps 17*a* and 17*b* completely rotated in the direction indicated by the arrow D (FIG. 2).

Under the states shown in FIG. 8B, the guides 14*a* and 14*b*, the cassette detectors 15*a* and 15*b*, and the stoppers 18*a* and 18*b* never protrude from the level of the bottom of the cassette opening 10, or are positioned at the level of the bottom of the cassette opening. The lower flaps 17*a* and 17*b* and the upper surface 12*a* of the frame 12 form a substantially one plane.

The large cassette 1L is then accurately loaded into the specific position (deeper than illustrated in FIG. 9) in the cassette holder for recording or reproduction.

As disclosed in detail, a cassette holder according to the present invention allows a large cassette and a small cassette to be selectively loaded.

An upper surface of a frame of the cassette holder is a part of a bottom surface of a cassette opening having a size that fits the large cassette, the large or the small cassette being to be loaded through cassette opening.

A pair of positioning-restriction elements is provided inside the cassette holder when viewed from the cassette opening. The distance between the positioning-restriction elements has a width enough for the small cassette to be loaded therebetween to a predetermined position in the cassette holder.

A cassette detector detects the large cassette when this cassette is loaded through the cassette opening. At least a part of the cassette detector is positioned so that it is closer to a front-end section of the cassette opening than the positioning-restriction elements are when viewed from the cassette opening.

A drive mechanism moves the positioning-restriction elements from positions at which the restriction elements allow the small cassette to be loaded therebetween to other positions at which the restriction elements do not obstruct the large cassette to be loaded, when the cassette detector detects the large cassette.

Each of a pair of flaps is positioned so that it is closer to the front-end section of the cassette opening than the positioning-restriction elements are when viewed from the cassette opening. The distance between the flaps has a width enough for the small cassette to be loaded therebetween to the predetermined position in the cassette holder. The flaps are opened to allow the large cassette to be loaded when the flaps are pushed by the large cassette whereas the flaps are engaged with the restriction elements to obstruct the small cassette to be loaded when at least either of the flaps is pushed by the small cassette.

Figure 1:
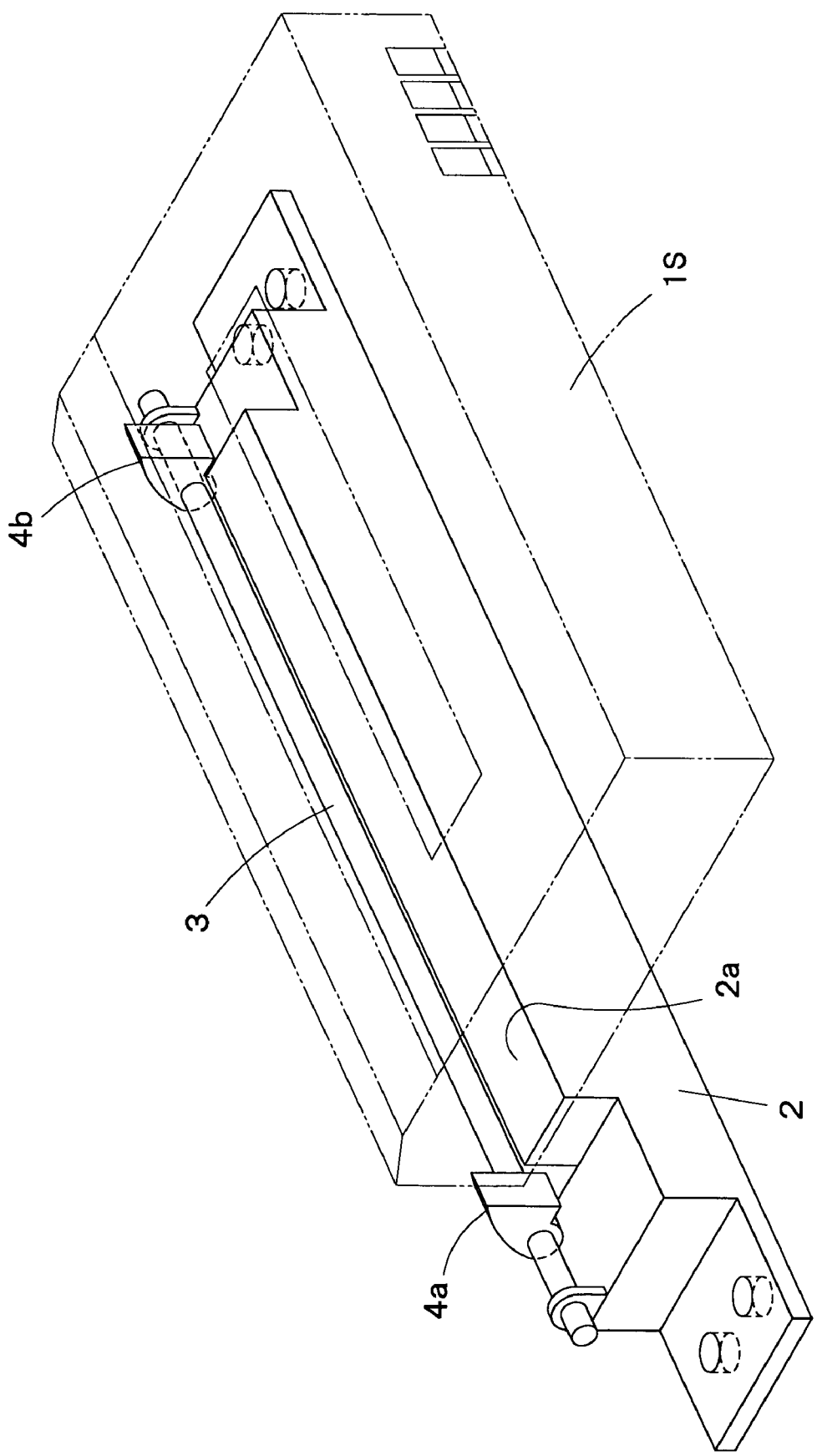
FIG. 1 is a perspective view showing major components of a known cassette holder.

The pair of flaps guides a user to an exact loading position when he or she loads the small cassette into the cassette opening 10. Therefore, the small cassette can be smoothly loaded into the cassette holder, different from the known mechanism (FIG. 1) in which users have to shift the small cassette in left and right to find the guides 4*a* and 4*b* when loading it through the cassette opening.

What is claimed is:

1. A cassette holder into which a large cassette and a small cassette are selectively loaded, the small cassette having a width smaller than a width of the large cassette, the cassette holder comprising:

a frame, an upper surface of the frame being a part of a bottom surface of a cassette opening having a size that fits the large cassette, the large or the small cassette being able to be loaded through the cassette opening;

a pair of positioning-restriction elements, provided inside the cassette holder when viewed from the cassette opening, a distance between the positioning-restriction elements having a width enough for the small cassette to be loaded therebetween to a predetermined position in the cassette holder;

a cassette detector to detect the large cassette when the large cassette is loaded through the cassette opening, at least a part of the cassette detector being positioned as being closer to a front-end section of the cassette opening than the positioning-restriction elements are when viewed from the cassette opening;

a drive mechanism to move the positioning-restriction elements from positions at which the positioning-restriction elements allow the small cassette but not the large cassette to be loaded therebetween to other positions at which the positioning-restriction elements do not obstruct the large cassette to be loaded, when the cassette detector detects the large cassette; and first and second flaps, each of the first and second flaps being positioned as being closer to the front-end section of the cassette opening than the positioning-restriction elements are when viewed from the cassette opening, a distance between the first and second flaps being wide enough for the small cassette to be loaded therebetween to the predetermined position in the cassette holder, the first and second flaps being opened to allow the large cassette to be loaded when the first and second flaps are pushed by the large cassette whereas the first and second flaps being engaged with the positioning-restriction elements to obstruct the small cassette from being loaded when at least either of the first or second flaps is pushed by the small cassette.

2. The cassette holder according to claim 1 further comprising a third flap having first and second notches in which the first and second flaps are fit to shut the cassette opening.

* * * * *